United States Patent [19]

Erkkilä

[11] Patent Number: 5,213,857
[45] Date of Patent: May 25, 1993

[54] WALL MATERIAL FOR A CELL-STRUCTURE PLANT GROWING CONTAINER AND A CELL-STRUCTURE GROWING CONTAINER MADE OF THE MATERIAL

[75] Inventor: Jukka Erkkilä, Pello, Finland

[73] Assignee: Kalottinvest Oy, Pello, Finland

[21] Appl. No.: 472,370

[22] Filed: Jan. 29, 1990

[30] Foreign Application Priority Data

Feb. 1, 1989 [FI] Finland .................................. 890484

[51] Int. Cl.$^5$ .................... A01G 23/02; B32B 5/02; B32B 1/08
[52] U.S. Cl. .................................. 428/34.1; 428/233; 428/284; 428/286; 47/73; 47/74; 47/86; 427/538
[58] Field of Search ............... 47/73, 74, 86; 428/233, 428/34.1, 284, 286; 427/39

[56] References Cited

U.S. PATENT DOCUMENTS

| | | | |
|---|---|---|---|
| 2,202,664 | 5/1940 | Leatherman | 47/73 |
| 3,962,823 | 6/1976 | Zipperer, III | 47/73 |
| 4,231,186 | 11/1980 | Ruuska | 47/74 |
| 4,578,899 | 4/1986 | Katila et al. | 47/86 |
| 4,610,761 | 9/1986 | Eklund et al. | 162/182 |
| 4,884,367 | 12/1989 | Lawton | 47/73 |

FOREIGN PATENT DOCUMENTS

| | | |
|---|---|---|
| 761655 | 12/1977 | Finland . |
| 69386 | 2/1986 | Finland . |
| 71213 | 12/1986 | Finland . |
| 443281 | 2/1986 | Sweden . |

Primary Examiner—George F. Lesmes
Assistant Examiner—Terrel Morris
Attorney, Agent, or Firm—Ladas & Parry

[57] ABSTRACT

The invention relates to a wall material for a cell-structure plant growing container comprising several layers out of which at least one is of a decayable material, such as paper, and which is characterized in that it comprises at least three material layers bonded together, all the layers being permeable to water and nutrients and the middle layer being formed by a nonwoven or reticulate material impregnated with a growth control agent or comprising firmly attached to its both sides a growth control agent, or a layer of decayable material, such as paper, in which the side facing said middle layer is coated with a growth control agent. The invention is also concerned with the use of said wall material, and to a cell-structure plant growing container made of the material.

15 Claims, No Drawings

WALL MATERIAL FOR A CELL-STRUCTURE PLANT GROWING CONTAINER AND A CELL-STRUCTURE GROWING CONTAINER MADE OF THE MATERIAL

The invention relates to a wall material for a cell-structure plant growing container, comprising several layers at least one of which is of a decayable material, such as paper. The wall material of the invention comprises at least three, preferably five material layers attached to each other. All the material layers are permeable to water and nutrients, and the middle layer consists of a nonwoven or reticulate material having a growth control agent absorbed into it or comprising firmly attached to its both sides a growth control agent, or a layer of decayable material, such as paper, in which the side facing said middle layer is coated with a growth control agent.

The invention is also concerned with the use of the above-mentioned wall material in a cell-structure growing container to produce a cell-structure growing container for block seedlings in which the shell surrounding the bock and as a consequence the growth control agent is removed before planting.

The invention is further concerned with a cell-structure container made of said wall material for growing seedlings, the growing container comprising several mutually parallel rows of pots and two adjacent rows of pots comprising a common wall structure which decays partly during growing.

In the invention, the shell surrounding the block in the container can be removed easily before planting, so it does not hamper the growth of roots after planting.

Finnish Patent 71650 discloses a cell-structure plant growing container comprising several mutually parallel rows of pots. Two adjacent rows of pots have a common wall structure which decays partly during the growth of the plants. The wall structure consists of three material layers laminated together, the middle layer being made of plastic and a thin decayable paper layer being provided on both sides of the middle layer. After the decay of the paper layers, stripes of glue remain between the plastic layers, preventing the growth of roots from one pot to another along the joints. The glue may contain a root growth control agent, or a growth control agent can be absorbed into the paper layers. The plastic material forming the middle layer is, e.g., of polyethylene or polypropylene, so that the block plants are easy to remove due to the loose "plastic bands" which wave between the plants separately from each other. This structure, however, is rather tight so that nutrients are not able to pass through the wall. In addition, when growing roots reach the membrane they begin to grow along its surface around the container, causing root deformation at a later stage of growth so that the plant may fall and die. In an attempt to solve this problem, the paper material has been coated or impregnated with a copper compound known per se. However, the attachment of the paper-copper compound web so obtained to the plastic band of the middle layer has not been reliable, so that the copper compound may remain on the surface of the block at the planting step, hampering the rooting of the plant in the planting ground.

Finnish Patent 71213 discloses a material for a cell-structure plant growing container, comprising a decayable paper layer and a reticulate structure attached to its one or both sides. The reticulate structure is made of bitumen, tall resin, tall-oil pitch, dextrine and/or water glass, so that it also decays though slowly. The purpose is to prevent harmful poisonous substances and other unnecessary substances having injurious effect on plant growth from remaining in the ground. The reticulate structure optionally contains plant nutrients, vegetable poisons and/or plant trace elements.

The novel wall material comprises at least three, preferably five material layers bound together, each layer being permeable to water and nutrients. The middle layer preferably consists of a nonwoven fabric in or on which an agent controlling the growth of roots, such as a copier compound known per se, is anchored. The nonwoven fabric is preferably viscose-based or it may be a combination of a viscose-based fibre and a fully synthetic fibre, such as polyester or polypropylene, in which the growth control agent is easy to anchor. It is also possible to use a fabric consisting of fully synthetic fibre only, whereby the agent controlling the growth of roots is either anchored in the inner surfaces of the paper and by dot gluing to the nonwoven fabric, or the nonwoven fabric is treated with corona discharge (electric wind), a primer or some other agent facilitating the attachment of the growth control agent.

The viscose-based nonwoven fabric is preferably modified by N-methylol compounds, such as the reaction product of urea, glyoxal and formaldehyde. The manufacture of this kind of product is described in Finnish Patent 71802. Also in this case, a root growth control agent is anchored in the nonwoven fabric, and the nonwoven fabric is bound to the paper layers by dot gluing.

The function of the copper compound is to prevent the growth of roots through the middle layer, which, as mentioned above, is a nonwoven or reticulate structure consisting of nonwoven fabric, paper, or glue. The copper compound stops the growth of the tip of the roots while causing the root to branch strongly so that roots ideal for planting purposes are achieved.

Root growth control agents are often copper compounds, among which copper chromate has proved one of the most effective. The chrome of the compound may cause allergic reactions in predisposed humans. In the invention, this chemical is disposed in the middle portion of the wall material, wherefore, contrary to surface treated products, the user will not get into contact with the chemicals when handling the product in gardens and nurseries.

As distinct from the invention of Finnish Patent 71650 the material for a cell-structure growing container according to the invention does not require impregnation of glue in the paper. Increase in the mass of roots as well as fertilization and watering push the substrate outward while the decaying of the paper material proceeds, and when a root starts to grow out of one pot into another, it always gets into the chemically treated area so that its growth is stopped. In addition, the chemical layer attached to the middle layer is removed with the layer.

The cell-structure growing container is formed by applying stripes of glue to multilayer laminate sheets which are then piled on top of each other. The shape and size of the container can be varied by varying the width and position of the glue stripes.

The following example is illustrative of the invention.

EXAMPLE

A. Manufacture of wall material

The nonwoven fabric used was a 20 g/m² nonwoven fabric manufactured by J W Suominen Oy, Finland, and containing 40% viscose and 60% polypropylene. The fibres of the nonwoven fabric had been bonded together by passing the web through a hot calendar as a result of which the polypropylene fibres had melted slightly on the surface, being thus bonded together and bonding the viscose fibres to the web.

A KC-73 anti-rot agent manufactured by Kemira Oy, Finland, was absorbed into the nonwoven fabric in an amount of 4 to 6 g/m² by immersing the web in the solution and by passing it after the immersion through a nip to remove the excess of the chemical solution. The nonwoven fabric was then passed into a drying tunnel having a temperature of about 100° C. to remove the water contained in the chemical solution. After drying the web was rolled.

After said chemical treatment the nonwoven fabric was transferred to an unrolling station in a laminating machine. In addition to the fibre web unrolling station, the machine comprised two other unrolling stations for paper rolls 1 and 2, the two other stations being so positioned that the nonwoven fabric was positioned between the paper layers at the laminating step. The width of the paper web was 54.5 cm. The grammage of paper in both rolls was 40 g/m². The webs were laminated together in the following way: The lowest paper web was passed via a glue application apparatus to a lamination nip. Glue was applied to the web by a screen roller in an amount of 12 to 20 g/m². The glue was water-insoluble Sitol 4033 dispersion glue manufactured by Kiilto Oy, Finland. The glue was applied to the web in dots which covered 50 to 70% of the surface area of the paper. The nonwoven fabric and the other paper web were passed to the same lamination nip. At the nip the glue dots penetrated through the nonwoven fabric and bonded together all the three layers into a single laminate web. The laminate web was dried by means of drying cylinders before rolling.

B. Manufacture of a cell-structure growing container

To manufacture a cell-structure growing container, two laminate rolls manufactured as described above were passed to a container machine.

Six stripes of glue each having a width of 19.6 mm were applied to the lowest laminate web in the direction of the length of the web (the width of the stripes covered ¼ and the unglued portions ¾ of the surface area of the laminate). In addition, a stripe of glue about 7 mm in width was applied to both edges of the laminate. The glue was Sitol 4044 dispersion glue manufactured by Kiilto Oy. The glue stripes laminated the lower and the upper web together while the unglued portions formed longitudinally extending pot tubes in the tube laminate. The tube laminate was passed to a glue application station which applied seven glue stripes having a width of 19.6 mm on the surface of the tube laminate precisely in the middle of the unglued portions in relation to the earlier stripes of glue. In this way the cell obtained was regularly hexagonal in shape. The diameter of the cell could be varied by varying the width and number of the glue stripes.

After the second gluing the tube laminate was cut into 30 cm high sheets a desired number of which were piled on top of each other. The piles of sheets were pressed in a press and dried for about one day and cut into cell sheets 5 to 10 cm high. The length of the cell-structure container was 59 cm and width 39 cm (fits into a 60 cm × 40 cm transport module), and the diameter of one cell was 39.2 mm.

I claim:

1. Wall material for a cell-structure plant growing container, comprising at least three layers bonded together, at least two of the layers being of a decayable paper, and a third of said layers constituting a middle layer all the layers being permeable to water and nutrients and the middle layer being formed of a nonwoven and non-decayable material, said wall material further comprising a root growth control agent, said root growth control agent being absorbed into the middle layer, being firmly attached to both sides of the middle layer or being coated on an inner side of each of two of the at least two layers of decayable paper such that it is sandwiched between each said inner side and said middle layer.

2. Wall material according to claim 1, wherein the nonwoven material is viscose-based.

3. Wall material according to claim 1, wherein the nonwoven material is a combination of a viscose-based fibre and a synthetic fibre.

4. Wall material according to claim 1, wherein the nonwoven material is a fully synthetic nonwoven fabric.

5. A cell-structure growing container comprising the wall material according to claim 1.

6. Wall material according to claim 1, wherein the root control agent is coated on an inner side of each of two of the at least two layers of decayable paper such that the growth control agent is sandwiched between each said side and said middle layer and thereby forms two additional layers, one on either side of said middle layer, whereby the wall material comprises five material layers.

7. Wall material according to claim 6, wherein the nonwoven material is of a viscose-based fibre or of a combination of a viscose-based fibre and a fully synthetic fibre.

8. Wall material according to claim 6, wherein the nonwoven material is of a fully synthetic fibre.

9. A cell-structure growing container comprising a wall material according to claim 6.

10. Wall material according to claim 1, wherein the root growth control agent has been absorbed into the middle layer, and wherein each of two of the at least two layers of decayable paper are attached to the middle layer on respective sides of the middle layer, whereby the wall material comprises three material layers.

11. Wall material according to claim 10, wherein the nonwoven material is of a viscose-based fibre or of a combination of a viscose-based fibre and a fully synthetic fibre.

12. A cell-structure growing container comprising a wall material according to claim 10.

13. Wall material according to claim 1, wherein the root growth control agent is firmly attached to each of two sides of the middle layer and thereby forms two additional layers, one between said middle layer and each of said at least two layers, whereby the wall material comprises five material layers.

14. Wall material according to claim 13, wherein the nonwoven material is a fully synthetic nonwoven fabric treated with corona discharge or a primer to facilitate attachment of the growth control agent to the middle layer.

15. A cell-structure growing container comprising a wall material according to claim 13.

* * * * *